(12) United States Patent
Mohr

(10) Patent No.: US 9,783,432 B2
(45) Date of Patent: Oct. 10, 2017

(54) APPARATUS AND METHOD FOR REDUCING SURFACE TENSION IN OXYGENATED WATER

(71) Applicant: Thomas James Mohr, Fort Pierce, FL (US)

(72) Inventor: Thomas James Mohr, Fort Pierce, FL (US)

( * ) Notice: Subject to any disclaimer, the term of this patent is extended or adjusted under 35 U.S.C. 154(b) by 660 days.

(21) Appl. No.: 13/870,887

(22) Filed: Apr. 25, 2013

(65) Prior Publication Data

US 2014/0318174 A1   Oct. 30, 2014

(51) Int. Cl.
*A61M 37/00* (2006.01)
*C02F 1/22* (2006.01)
*C02F 1/00* (2006.01)

(52) U.S. Cl.
CPC ................ *C02F 1/22* (2013.01); *C02F 1/005* (2013.01)

(58) Field of Classification Search
CPC . Y02B 30/545; A61M 1/3621; A61M 1/1699; B01D 2256/12; C02F 1/72; C02F 1/727; C02F 3/26; C02F 1/22; C02F 1/005
USPC ............ 261/28, 22, 29, 30, 37, DIG. 28; 210/627, 721, 758; 604/6.14; 128/898, 128/899; 607/104, 105
See application file for complete search history.

(56) References Cited

U.S. PATENT DOCUMENTS

| | | | | |
|---|---|---|---|---|
| 3,295,681 A * | 1/1967 | Rubert et al. | ............ | 210/167.26 |
| 3,643,403 A * | 2/1972 | Speece | ............ | 95/265 |
| 3,727,579 A * | 4/1973 | Lee | ............ | 119/201 |
| 4,501,664 A * | 2/1985 | Heil et al. | ............ | 210/614 |
| 5,275,742 A * | 1/1994 | Satchell et al. | ............ | 210/760 |
| 5,451,349 A * | 9/1995 | Kingsley | ............ | 261/91 |
| 5,766,484 A * | 6/1998 | Petit et al. | ............ | 210/703 |
| 5,888,467 A * | 3/1999 | Swift et al. | ............ | 423/335 |
| 5,904,851 A * | 5/1999 | Taylor et al. | ............ | 210/620 |
| 5,911,870 A * | 6/1999 | Hough | ............ | 205/701 |
| 5,979,363 A * | 11/1999 | Shaar | ............ | 119/230 |
| 6,474,627 B2 * | 11/2002 | Speece | ............ | 261/77 |
| 6,485,003 B2 * | 11/2002 | Speece | ............ | 261/77 |
| 6,503,403 B2 * | 1/2003 | Green et al. | ............ | 210/748.1 |
| 6,840,983 B2 * | 1/2005 | McNulty | ............ | 95/263 |
| 6,848,258 B1 * | 2/2005 | Speece | ............ | 60/649 |
| 8,276,888 B2 * | 10/2012 | Osborn et al. | ............ | 261/28 |
| 2002/0175127 A1 * | 11/2002 | Crowley et al. | ............ | 210/758 |

\* cited by examiner

*Primary Examiner* — William Gilbert
(74) *Attorney, Agent, or Firm* — The Rapacke Law Group, P.A.

(57) ABSTRACT

A non-chemical apparatus and method to lower the surface tension of a solution of liquid water and gaseous oxygen. An apparatus of the present invention comprises a source of chilled purified water, and gaseous oxygen fed into a positive displacement pump, followed by a cylinder reduced at one end by means of a convergent cone, a section of a smaller diameter cylinder attached to a divergent cone tapering up to another cylinder of a diameter the same or larger than the original cylinder. A coil of refrigeration tubing is wrapped around the smaller center cylinder to control the temperature of the inner cylinder surface.

1 Claim, 1 Drawing Sheet

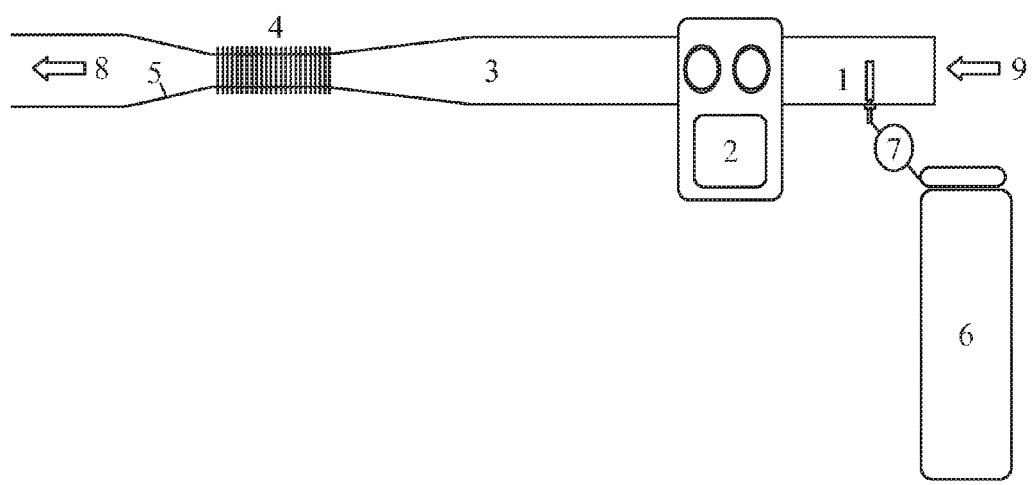

APPARATUS AND METHOD FOR REDUCING SURFACE TENSION IN OXYGENATED WATER

IN THE CROSS-REFERENCE TO RELATED APPLICATION

N/A

IN THE STATEMENT REGARDING FEDERALLY SPONSORED RESEARCH OR DEVELOPMENT

N/A

IN THE NAMES OF THE PARTIES TO A JOINT RESEARCH AGREEMENT

N/A

FIELD

The embodiments presented provide a medical device, and in particular, to a medical device used to reduce surface tension of a water/oxygen solution by a non-chemical means.

BACKGROUND

With many medical condition, today the ability to oxygenate areas of the patient's body may be compromised limiting the flow of arterial oxygen to the affected region and reducing the healing time in a patient's tissues, and limbs. Further, every year thousands of patients die from the inability to deliver this arterial oxygen to the affected areas. With many injuries such as rashes, skin sores, bruises, and wounds, the healing process may be severally restricted because of this depletion of the vital arterial oxygen to the tissue. Today medical facilities will use inhalers or hyperbaric chambers to administer the arterial oxygenated gases to elevate the levels of inhaled oxygen to the patient. This oxygen is then dissolved within the patient's bloodstream. However, hyperbaric chamber treatment and oxygen inhalers though recognized as highly beneficial, are not feasible for many patients due to the rising costs of these treatments.

SUMMARY OF THE INVENTION

The embodiments provide a medical device configured to reduce the surface tension of a water/oxygen solution using a non-chemical means. The apparatus includes a first cylinder having a carbonation stone and configured to receive a purified water source; a second cylinder having a smaller diameter than the diameter of the first cylinder; and a third cylinder having a cone which is configured to be connected to the second end of the first cylinder and the second end of the third cylinder connected to the first end of the second cylinder. During the use, the apparatus is configured to pump water to the apparatus from the first end of the first cylinder to the second end of the third cylinder where the water is chilled using refrigeration coils as it passes through the second cylinder.

IN THE BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a perspective view of an apparatus for reducing surface tension in oxygenated water.

DETAILED DESCRIPTION

The purpose of the invention is to provide a medical device used to reduce the surface tension of a water/oxygen solution by non-chemical means for ingestion by humans to increase their arterial oxygen saturation via the gastrointestinal system. A unique combination of physical and thermal dynamic forces is employed to reduce the effect of hydrogen bonding between water molecules thereby lowering the surface tension of the water. This is accomplished by infusing oxygen gas into pre-chilled purified water (1) then pumping it (2) under pressure through a device containing a straight cylinder followed by a convergent cone (3) with a smaller cylinder (4) at its outlet connected to a divergent cone (5) of equal dimensions. The smaller cylinder has two functions. It increases the velocity of the flow and is wrapped with a refrigeration coil (not labeled but surrounding 4) that enables it to lower the temperature of the laminar portion of the stream below the normal freezing point of 0 Degrees Centigrade. The increased flow rate prevents ice from forming on the inside of the cylinder. When the solution exits the small diameter section (5) some hexagonal phase ice crystals form as the flow slows down and the pressure decreases. As these ice crystals absorb heat energy from the surrounding water, they begin to melt. Ice melting in this way has to break the hydrogen bonds to transition from the solid phase to the liquid phase (the energy absorbed to make this happen is equal to raising the equivalent mass of water by 80 degrees centigrade. This is called the "heat of fusion") the action of the partial freezing and melting of the solution passing through the solid/liquid phase lowers the overall surface tension of the water surrounding the oxygen by weakening and breaking the hydrogen bonds.

Whenever one hydrogen bond between water molecules is broken, two more tend also to be broken. Hexagonal ice formations contain many hydrogen bonds (each of the ice crystals formed in this process contain many hydrogen bonds that must be broken in order to transition from the solid to the liquid phase) for each of these bonds that break, two bonds between the remaining water molecules are also broken which accounts for the effect of reducing the surface tension of the entire oxygen/water solution.

The value of reducing the surface tension in this application is that the oxygen dissolved in the water becomes more easily released from the solution when it is ingested. The air we breathe has oxygen trapped within water vapor. In order for the oxygen to escape from the surrounding water molecules (held together by surface tension) the surface tension of the water must be reduced so that the partial pressure of the oxygen (pO2) is greater than the surface tension of the water that has now coated the lung tissue (alveoli). The body accomplishes this by secreting pulmonary surfactant, a substance that lowers the surface tension of the water in the same way a detergent lowers the surface tension of laundry water for better wetting and penetration. When we drink water that has dissolved oxygen in it, the surface tension of the water tends to hold the oxygen in solution in much the same way. Reducing the surface tension of the solution by the above method accomplishes the same effect that the pulmonary surfactant does in the lungs making it easier for the oxygen to escape the water and permeate the capillaries of the GI tract.

What is claimed:

1. A medical device for reducing the surface tension of water comprising:
   a first cylinder having a first end and a second end, said first cylinder further comprising;
      a purified water source connected to said first end of said first cylinder, a carbonation stone within said first cylinder and proximate said first end of said first cylinder;
      a pressurized oxygen source connected to said carbonation stone, whereby oxygen from said pressurized oxygen source forces oxygen through said carbonation stone;
      a pump configured to pump purified water from said purified water source, said pump being between said carbonation stone and said second end of said first cylinder;
   a second cylinder having a first end and a second end and a diameter smaller than a diameter of said first cylinder, a refrigeration coil wrapped about an exterior surface of said second cylinder;
   a third cylinder having a first end and a second end and a diameter greater than said diameter of said second cylinder;
   a first cone portion having a first end connected to said second end of said first cylinder and a second end connected to said first end of said second cylinder, said cone converging from said first cone first end to said first cone second end;
   a second cone portion having a first end connected to said second end of said second cylinder and a second end connected to said first end of said third cylinder, said second cone diverging from said second cone first end to said second cone second end;
   said first cone portion and said second cone portion having equal dimensions;
   whereby said pump forces water through said carbonation stone and through said medical device from said first end of said first cylinder to said second end of said third cylinder, said refrigeration coil chills said water as said water passes through said second cylinder.

* * * * *